United States Patent
Staaden et al.

(10) Patent No.: US 11,441,891 B2
(45) Date of Patent: Sep. 13, 2022

(54) COORDINATE MEASURING MACHINE AND METHOD FOR CONTROLLING A COORDINATE MEASURING MACHINE

(71) Applicant: Carl Zeiss Industrielle Messtechnik GmbH, Oberkochen (DE)

(72) Inventors: Ulrich Staaden, Aalen (DE); Walter Puntigam, Heidenheim (DE); Franziska Schoenig, Ellwangen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 315 days.

(21) Appl. No.: 16/856,816

(22) Filed: Apr. 23, 2020

(65) Prior Publication Data
US 2020/0378746 A1    Dec. 3, 2020

(30) Foreign Application Priority Data

Apr. 23, 2019   (DE) ...................... 10 2019 110 508.0

(51) Int. Cl.
*G01B 11/00* (2006.01)
*G01B 11/24* (2006.01)

(52) U.S. Cl.
CPC ............ *G01B 11/005* (2013.01); *G01B 11/24* (2013.01)

(58) Field of Classification Search
CPC .... G01B 11/005; G01B 11/24; G01B 11/2518
See application file for complete search history.

(56) References Cited

U.S. PATENT DOCUMENTS

| 5,726,917 A | 3/1998 | Staaden |
| 6,154,713 A | 11/2000 | Peter et al. |
| 9,696,146 B2 | 7/2017 | Blanckaert et al. |

FOREIGN PATENT DOCUMENTS

| DE | 195 29 547 A1 | 2/1997 | |
| EP | 0 866 390 B1 | 9/2003 | |
| EP | 2975475 A1 * | 1/2016 | ............ B23Q 17/22 |
| WO | WO-2013/144293 A1 | 10/2013 | |

* cited by examiner

*Primary Examiner* — Rebecca C Bryant
(74) *Attorney, Agent, or Firm* — Miller Johnson

(57) ABSTRACT

A coordinate measuring machine for determining dimensional and/or geometric properties of a measurement object has a measurement element, which defines a reference point and is movable along multiple movement axes relative to a measurement object receptacle. The movement axes include multiple linear axes and at least one axis of rotation. In order to control the measurement element relative to a measurement object, desired positions of the reference point and parameters defining limit values for permissible velocities and/or accelerations are provided. Multiple individual temporal sequences of respective individual axial positions for the plurality of movement axes are determined as a function of the desired positions of the reference point and the parameters. The individual temporal sequences each have individual time intervals between successive individual axial positions. The individual temporal sequences are synchronized onto a common timing cycle, which uses the longest individual time interval in each case for each target position.

13 Claims, 3 Drawing Sheets

COORDINATE MEASURING MACHINE AND METHOD FOR CONTROLLING A COORDINATE MEASURING MACHINE

CROSS-REFERENCE TO RELATED APPLICATIONS

This application claims priority to German Application No. 10 2019 110 508.0 filed Apr. 23, 2019. The entire disclosure of the application referenced above is incorporated by reference.

FIELD

The present disclosure relates to industrial metrology and more particularly to coordinate measuring machines.

BACKGROUND

The present invention relates to a new method for controlling a coordinate measuring machine and to a coordinate measuring machine that is controlled in accordance with the new method.

One method for controlling a coordinate measuring machine is disclosed by DE 195 29 547 A1. In the method, a probe pin as one form of a tactile measurement element is moved as a function of demand data. The required control data for the machine controller are determined as a point sequence from the geometry data of the measurement object, such as e.g. CAD data, in a computer of the coordinate measuring machine. For this purpose, the computer determines a velocity profile, which is intended to ensure a movement process free of jolts and jerks and the shortest possible measurement time, by means of a suitable choice of the distances between the points of the point sequence. The known method has proved worthwhile in practice, but is restricted to the control of a coordinate measuring machine with a tactile measurement element which is moved solely along linear axes within the measurement volume.

EP 0 866 390 B discloses another method using a tactile measurement element, wherein the measurement element can now be moved along linear axes and along at least one axis of rotation relative to a measurement object. The axis of rotation can be realized with the aid of a rotary table, on which the measurement object is held. In other variants, the coordinate measuring machine can comprise a rotary-pivoting joint, with the aid of which the probe pin can be rotated and pivoted into different orientations. This known method involves calculating an associated desired rotation angle value for the probe pin directly after determining a target position of the probe head. If the angular velocity required for attaining the desired rotation angle value and the associated angular acceleration exceed predefined maximum values, the distances between the target positions are corrected until the conditions regarding maximum angular velocity and maximum angular acceleration can be met. Subsequently, the probe pin is moved from target position to target position and additionally rotated by the calculated rotation angles in a defined timing cycle. This known method makes it possible to measure virtually any contours on a measurement object in an automated manner.

The automated measurement of a measurement object with a tactile measurement element that is movable along a plurality of linear axes and along one or more axes of rotation relative to a measurement object has made possible, in particular, a rapid measurement of freeform surfaces. However, a tactile measurement element provides only one coordinate measurement value at the measurement object at each measurement instance of time. Therefore, with a tactile measurement element, a complete 3D measurement of a measurement object ("3D scan") is possible only with difficulty.

Measurement elements that can detect measurement points on a measurement object without contact—in particular, optically—are an alternative to tactile measurement elements. By way of example, WO 2013/144293 A1 discloses a measurement element having a light source, which generates a light plane, and having an image sensor, which captures light reflected from the measurement object surface. The light plane generates a line on the measurement object surface, which line provides a plurality of measurement points lying next to one another on the measurement object surface. The applicant offers another known measurement element, which determines coordinate measurement values according to the triangulation principle with the aid of a laser line projected onto the measurement object. This measurement element bears the brand name EagleEye II and is used for quality assurance in the production of motor vehicle bodies.

Optimum alignment of the laser line on the measurement object surface in each case and the image capture rate of such a measurement element impose new requirements for the control of a coordinate measuring machine, in particular if a large-area automated measurement is desired.

SUMMARY

Against this background, it is an object to provide a method for controlling a coordinate measuring machine that enables a fast and accurate movement of a measurement element along a plurality of linear axes and axes of rotation taking account of numerous different boundary conditions.

It is another object to provide a method for controlling a coordinate measuring machine that enables an efficient large-area measurement of a measurement object using a measurement element that can simultaneously detect a plurality of measurement points on the measurement object.

It is yet another object to provide a coordinate measuring machine having a measurement element that can be controlled in an efficient manner in order to scan a measurement object in an automated manner.

In accordance with one aspect, there is provided a method for controlling a coordinate measuring machine comprising a machine controller, a measurement object receptacle and a measurement element, wherein the measurement element defines a reference point and is movable within a measurement volume relative to the measurement object receptacle along a plurality of movement axes, and wherein the plurality of movement axes include a plurality of linear axes and at least one axis of rotation, the method comprising the steps of obtaining a plurality of desired positions of the reference point within the measurement volume; obtaining a plurality of parameters defining limit values for at least one of permissible velocities or permissible accelerations of the measurement element along the plurality of movement axes; determining a plurality of axial position series as a function of the desired positions of the reference point and as a function of the plurality of parameters, with each axial position series from the plurality of axial position series defining an individual series of target positions of the measurement element along one respective linear axis from the plurality of linear axes; determining a plurality of successive rotation angle values as a function of the desired positions of the reference point and as a function of the plurality of parameters, with each rotation angle value from the plurality of successive rotation angle values representing a rotation angle of the measurement element about the at least one axis of rotation at the respective target positions of the measurement element along the plurality of linear axes; determining a plurality of individual temporal sequences of target positions for each linear axis from the plurality of linear axes, wherein the plurality of individual temporal sequences of target positions each have individual time intervals between successive ones of the individual target positions; determining a respective temporal sequence of successive rotation angle values for the at least one axis of rotation, the respective temporal sequence of successive rotation angle values having individual time intervals between successive rotation angle values; synchronizing the plurality of individual temporal sequences of target positions and the respective temporal sequence of successive rotation angle values onto a common timing cycle by using a respective longest individual time interval among the plurality of individual time intervals for each respective target position and each respective rotation angle value; and moving the measurement element to the respectively successive target positions and rotating the measurement element using the plurality of rotation angle values in accordance with the common timing cycle.

In accordance with another aspect, there is provided a coordinate measuring machine for determining at least one of dimensional or geometric properties of a measurement object, comprising a machine controller; comprising a measurement object receptacle; comprising a measurement element defining a reference point and being movable relative to the measurement object receptacle along a plurality of movement axes, wherein the plurality of movement axes include a plurality of linear axes and at least one axis of rotation; and comprising an operating terminal; wherein the machine controller is configured to move the measurement element as a function of control data along the plurality of movement axes in order to record measurement values at the measurement object; and wherein the operating terminal comprises an interface for receiving a plurality of desired positions of the reference point at the measurement object; a memory configured to store a plurality of parameters defining limit values for at least one of permissible velocities or permissible accelerations of the measurement element along the plurality of movement axes; and a processor configured to determine a plurality of axial position series as a function of the desired positions of the reference point and as a function of the plurality of parameters, with each axial position series from the plurality of axial position series defining an individual series of target positions of the measurement element along one respective linear axis from the plurality of linear axes; configured to determine a plurality of successive rotation angle values as a function of the desired positions of the reference point and as a function of the plurality of parameters, with each rotation angle value from the plurality of successive rotation angle values representing a rotation angle of the measurement element about the at least one axis of rotation at the respective target positions of the measurement element along the plurality of linear axes; configured to determine a plurality of individual temporal sequences of target positions for each linear axis from the plurality of linear axes, wherein the plurality of individual temporal sequences of target positions each have individual time intervals between successive ones of the individual target positions; configured to determine a respective temporal sequence of successive rotation angle values for the at least one axis of rotation, the respective temporal sequence of successive rotation angle values having individual time intervals between successive rotation angle values; configured to synchronize the plurality of individual temporal sequences of target positions and the respective temporal sequence of successive rotation angle values onto a common timing cycle by using a respective longest individual time interval among the plurality of individual time intervals for each respective target position and each respective rotation angle value; and configured to determine the control data as a function of the plurality of individual temporal sequences of target positions and the respective temporal sequence of successive rotation angle values synchronized onto the common timing cycle.

In accordance with yet another aspect, there is provided a computer program product comprising a non-transitory storage medium storing program code that is configured to carry out a method for controlling a coordinate measuring machine comprising a machine controller, a measurement object receptacle and a measurement element, wherein the measurement element defines a reference point and is movable within a measurement volume relative to the measurement object receptacle along a plurality of movement axes, and wherein the plurality of movement axes include a plurality of linear axes and at least one axis of rotation, the method comprising the steps of obtaining a plurality of desired positions of the reference point within the measurement volume; obtaining a plurality of parameters defining limit values for at least one of permissible velocities or permissible accelerations of the measurement element along the plurality of movement axes; determining a plurality of axial position series as a function of the desired positions of the reference point and as a function of the plurality of parameters, with each axial position series from the plurality of axial position series defining an individual series of target positions of the measurement element along one respective linear axis from the plurality of linear axes; determining a plurality of successive rotation angle values as a function of the desired positions of the reference point and as a function of the plurality of parameters, with each rotation angle value from the plurality of successive rotation angle values representing a rotation angle of the measurement element about the at least one axis of rotation at the respective target positions of the measurement element along the plurality of linear axes; determining a plurality of individual temporal sequences of target positions for each linear axis from the plurality of linear axes, wherein the plurality of individual temporal sequences of target positions each have individual time intervals between successive ones of the individual target positions; determining a respective temporal sequence of successive rotation angle values for the at least one axis of rotation, the respective temporal sequence of successive rotation angle values having individual time intervals between successive rotation angle values; synchronizing the plurality of individual temporal sequences of target positions and the respective temporal sequence of successive rotation angle values onto a common timing cycle by using a respective longest individual time interval among the plurality of individual time intervals for each respective target position and each respective rotation angle value; and moving the measurement element to the respectively successive target positions and rotating the measurement element using the plurality of rotation angle values in accordance with the common timing cycle. The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The novel method and coordinate measuring machine initially determine temporally successive axial positions along the linear axes and axes of rotation in a manner temporally uncorrelated with respect to one another. Therefore, the temporal sequences for each movement axis initially have respectively individual time intervals between successive axial positions. Beyond the respectively individual axial positions, the temporal sequences are also individual because they have individual time intervals between successive axial positions. As a kind of interim result, the novel method and the corresponding coordinate measuring machine thus provide individual temporal sequences of axial positions for the individual linear axes and axes of rotation, wherein these axial positions are intended to be attained simultaneously in each case during the later course of control. The temporal sequences are initially unsynchronized.

It is only in a second step that the individual temporal sequences are synchronized with one another. In this case, for each time interval between two successive axial positions, the "slowest" movement axis in each case is used as a "leading axis". "Slow" here does not necessarily relate to the absolute value of the movement velocity of an axis, but rather to the time duration required by the "slowest" movement axis, taking account of the boundary conditions relevant to this movement axis, to pass from a preceding individual axial position to a succeeding individual axial position. Therefore, "slow" can also result from the fact that the affected movement axis has to traverse a relatively long movement distance.

Therefore, the leading axis function here typically alternates in the course of synchronization. By way of example, for a first time interval required to pass from all first axial positions along the movement axes to all respectively succeeding second axial positions, a linear axis of the coordinate measuring machine, such as the X-axis, for example, may have the leading axis function, while an axis of rotation has the leading axis function for a later time interval between the second axial positions and respectively succeeding third axial positions. It is possible for a movement axis to have the leading axis function for the temporal synchronization over a plurality of successive time intervals, but the leading axis function in the case of the novel method and the corresponding coordinate measuring machine will typically alternate back and forth between different movement axes a number of times. Here the longest time interval in each case, i.e. the time interval of that movement axis which requires the longest to adopt the next individual axial position, always determines the time duration available to all movement axes for changing from the respectively preceding first individual axial position to the succeeding second individual axial position. On the other hand, the longest time interval also limits the time duration for the position changes along all axes, such that the synchronized position changes take place as fast as possible taking account of all individual boundary conditions for all axes.

One might illustrate the temporal synchronization by imagining a plurality of persons, all of whom proceed along a respectively individual route plan with individual target points. A uniform time duration is available to each person for his/her change from a current individual target point to his/her next individual target point. The uniform time duration is determined for each position change by that person who requires the longest time for his/her current position change. All other persons are then guided thereby. In the event of reaching their next individual target point prematurely, they could wait until all other persons have reached their respective next individual target point, and/or they may reduce their individual movement velocity until reaching the next target point.

In a comparable way, after the synchronization, time intervals of uniform length are available to all movement axes in order to pass from a preceding individual axial position to a succeeding individual axial position. The respective length of the time intervals of uniform length is determined for each time interval by the longest time interval in each case being adopted as a uniform synchronization interval for all movement axes. After the synchronization is effected in this way, the individual movement velocity along the individual movement axes can then be determined as a function of the uniform time interval.

The novel method and the corresponding coordinate measuring machine thus initially receive a plurality of desired positions at which the reference point of the measurement element is intended to be positioned within the measurement volume. The measurement element can be a tactile measurement element, in principle. In various implementations, the measurement element is an optical measurement element which can detect a plurality of measurement points on a measurement object simultaneously. In various implementations, the measurement points detected simultaneously lie along a line, such as in the case of a laser triangulation sensor, for example, and/or within a defined area, such as in the case of a stripe projection sensor, for example.

In various implementations, the desired positions represent a plurality of selected measurement points on the measurement object surface. Advantageously, the desired positions can be determined from a data set representing the measurement object, such as, for instance, a CAD data set or a measurement data set which was acquired on a measurement object of identical type. In example embodiments which employ a tactile measurement element, the reference point can be the ball center point of a probe ball. In the case of an optical measurement element, the reference point can be a focal point of the measurement optical unit. In some cases, the reference point may be a so-called tool center point (TCP). The desired positions of the reference point define a desired measurement path relative to the measurement object surface, along which the reference point is intended to move. In various example embodiments, the desired positions are discrete sample points of a desired measurement path that for the rest is continuous.

Furthermore, the novel method and the corresponding coordinate measuring machine use a plurality of parameters defining upper and/or lower limit values for velocities and/or accelerations of the measurement element along the plurality of movement axes. Further parameters may include the size and/or the weight of the measurement element and/or a desired location of the reference point and/or an orientation of the measurement element relative to the measurement object. The desired positions and parameters form input variables from which are determined the individual control data used ultimately to move the measurement element.

A plurality of the target positions of the measurement element along the linear axes and the axes of rotation are determined on the basis of the desired positions of the reference point and the parameters. In contrast to the prior art, a plurality of individual temporal sequences of respectively individual axial positions along the movement axes are determined as if the different movement progressions along the movement axes could take place in an uncorrelated manner with respect to one another. It is only in the subsequent step that the individual temporal sequences are synchronized onto a common timing cycle and are thus combined to form a combined movement progression. Advantageously, it can be assumed here that the movement of the measurement element along each movement axis and in each time interval can be performed in each case with the maximum possible acceleration and velocity that is possible taking account of the parameters mentioned in the introduction along the respective axis. This has the consequence that the movement along all movement axes is initially assumed to be as fast as possible. The measurement element is thus also moved as fast as possible after the synchronization.

Furthermore, the novel method and the corresponding coordinate measuring machine enable a coordinated overall movement of the measurement element along a plurality of movement axes taking account of a plurality of different boundary conditions which apply in part only to individual axial movements. In particular, the novel method and the corresponding coordinate measuring machine are suitable for automatically moving an optical measurement element, enabling a complete 3D scan of a measurement object in an efficient manner. The object mentioned above is therefore completely achieved.

In various implementations, as a function of the plurality of desired positions, a desired measurement path of the reference point within the measurement volume is determined with the aid of interpolation, wherein the series of successive target positions is determined as a function of the desired measurement path.

In various implementations, the desired measurement path is determined with the aid of a spline interpolation, in particular using cubic-quadratic Bezier splines. Determination of the successive target positions as a function of such a desired measurement path makes it possible to control the measurement element without jolts and jerks within the measurement volume in an efficient manner.

In a further refinement, a location-dependent desired radial velocity profile and a location-dependent desired tangential velocity profile of the reference point along the plurality of desired positions are initially determined as a function of the parameters. It is particularly advantageous if the two desired velocity profiles mentioned are determined using the desired measurement path mentioned above.

Determination of the desired radial velocity profile makes it possible, in a simple manner, to take account of centrifugal forces owing to a curved movement of the measurement element and to ensure that transverse accelerations of the measurement element are kept below a predefined maximum value. This advantageously contributes to increasing the measurement accuracy and to reducing wear. Determination of the location-dependent desired tangential velocity profile makes it possible, in a simple manner, to keep the velocity and acceleration in the direction of movement within predefined limit values. This, too, advantageously contributes to increasing the measurement accuracy and to achieving a high measurement resolution.

With the use of an optical measurement element having an image or camera sensor, it is additionally advantageous if the velocity of the measurement element along the desired measurement path is adapted to the image capture rate of the image or camera sensor. If the measurement element is moved along the desired measurement path too rapidly, this is unfavourable for the measurement resolution. By contrast, if the measurement element is moved too slowly, this is detrimental to productivity. Determination of the two desired velocity profiles makes it possible to optimize the movement of the measurement element relative to the measurement object with regard to measurement accuracy, measurement resolution and measurement speed in a simple manner.

In a further refinement, a desired temporal velocity profile for the reference point within the measurement volume is determined as a function of the location-dependent desired radial velocity profile and as a function of the location-dependent desired tangential velocity profile.

In this refinement, the two separate location-dependent desired velocity profiles are combined to form a common temporal desired velocity profile. The refinement provides a simple possibility for deriving the movements of the measurement element along the plurality of movement axes from a common reference variable.

In a further refinement, the measurement element defines a measurement line having a plurality of measurement points, wherein the measurement line runs through the reference point.

In this refinement, the novel method and the corresponding coordinate measuring machine use, in particular, a laser line sensor operating according to a triangulation principle. A measurement element of this type makes it possible to simultaneously record a plurality of measurement points along the measurement line and is therefore particularly suitable for a complete 3D scan of a measurement object. The advantages of the novel method and of the corresponding coordinate measuring machine are manifested particularly in combination with such a measurement element.

In a further refinement, the series of successive target positions of the measurement element and the successive rotation angle values are determined as a function of a spatial orientation of the measurement line. In various implementations, the target positions and rotation angle values are further determined as a function of the respective orientation of the measurement object surface, in particular as a function of a respective local normal vector of the measurement object surface.

This refinement advantageously contributes to optimizing the measurement line of the measurement element in each case optimally toward the measurement object surface and in particular toward the respectively local orientation of the measurement object surface at each measurement time. Consequently, this refinement contributes to achieving a uniformly high measurement accuracy during a 3D scan of a measurement object.

In various example embodiments, for each desired position along the desired measurement path, an auxiliary point is generated at a constant distance and in the direction of the respective surface normal of the measurement object surface at the desired point, and a second interpolation curve, in particular in the form of a spline interpolation, parallel to the desired measurement path is determined. The desired measurement path is thus supplemented by information concerning the normal direction of the measurement object surface at each desired position and the supplemented desired measurement path makes it possible, in a simple manner, to determine an optimum orientation of the measurement element for each measurement point at the measurement object surface.

In a further refinement, the spatial orientation of the measurement line is chosen transversely to a path along the plurality of desired positions of the reference point, that is to say thus transversely with respect to the desired measurement path mentioned above. In various example embodiments, the orientation of the measurement line is chosen to be in each case perpendicular to the desired measurement path. In various example embodiments, it is possible for the angle formed between the measurement line and the desired measurement path to be made selectable, such that an operator can input a desired angle between the measurement line and the desired measurement path as a parameter value.

In a further refinement, the spatial orientation of the measurement line is chosen such that the reference point leads or lags behind the measurement element along the plurality of desired positions.

This refinement is advantageous for reducing measurement errors resulting from unwanted reflections at a specularly reflective measurement object surface.

In a further refinement, a sequence of control data for a machine controller of the coordinate measuring machine is determined as a function of the plurality of individual temporal sequences of respectively individual axial positions.

Advantageously, the sequence of control data is determined using the temporal sequences synchronized with a common timing cycle. The refinement has the advantage that the temporal sequences of respectively individual axial positions can be converted into control data for the individual axes of the coordinate measuring machine very simply and rapidly. In various implementations, the control data for the controller of the coordinate measuring machine (CMM) include separate control data sequences for each movement axis, which are determined directly from the respectively associated temporal sequences and synchronized axial positions.

In a further refinement, the sequence of control data is determined with a predefined control data timing cycle that is derived from the common second timing cycle by intermediate positions being determined.

This refinement advantageously contributes to providing the control data with a timing cycle adapted to the machine controller, wherein the control data timing cycle can differ from the common timing cycle of the sequences of individual axial positions. The refinement enables a simple adaptation of the novel method for different coordinate measuring machines having different control data timing cycles. Determining intermediate positions is a very efficient possibility for adapting the temporal sequences to a higher control data timing cycle.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Example embodiments of the invention are illustrated in the drawing and will be explained in greater detail in the following description. In the figures.

DETAILED DESCRIPTION

Figure 1:
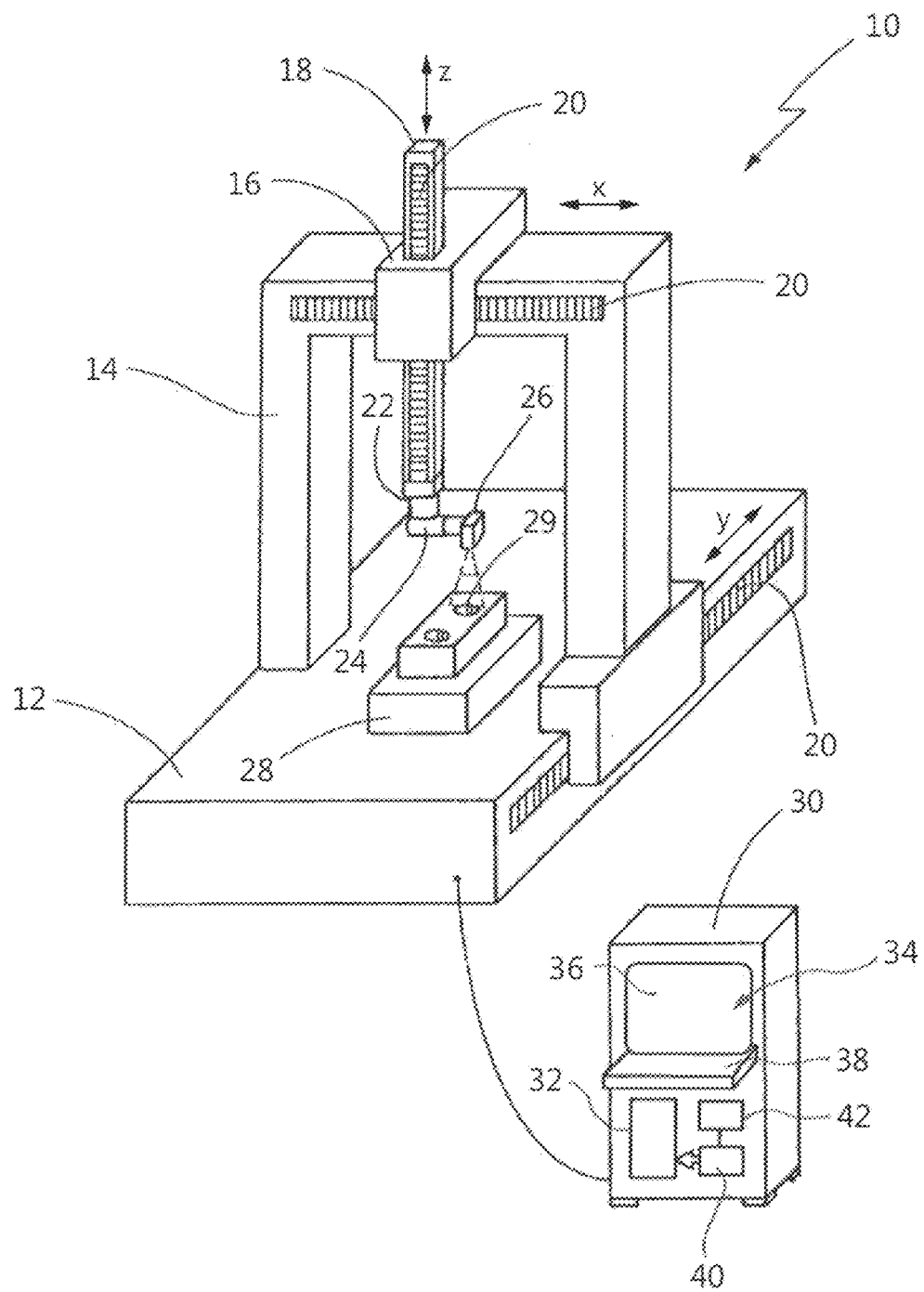
FIG. 1 shows an example embodiment of the novel coordinate measuring machine.

In FIG. 1, an example embodiment of the novel coordinate measuring machine is designated in its entirety by reference numeral 10. The coordinate measuring machine 10 here has a base 12, on which a gantry 14 is arranged movably in the Y-direction. The gantry 14 carries a slide 16, which here is mounted movably in the X-direction. The slide 16 carries a sleeve 18, which here is mounted movably in the Z-direction. Reference sign 20 designates linear scales arranged along the three movement axes X, Y, Z, such that the respective position of the gantry 14, of the slide 16 and of the sleeve 18 along the axes X, Y, Z can be determined with the aid of suitable sensors (not illustrated here).

The coordinate measuring machine 10 is an example embodiment of a coordinate measuring machine having three linear axes arranged orthogonally to one another. In further example embodiments, the novel coordinate measuring machine may be a horizontal arm coordinate measuring machine, a coordinate measuring machine of cantilever design, a coordinate measuring machine of bridge design having stationary columns and a movable bridge or, for example, a coordinate measuring machine having a stationary gantry, in which the workpiece receptacle is movable along one or two linear axes. Generally, example embodiments of the novel coordinate measuring machine can have any kinematic construction that makes it possible to move a measurement element along a plurality of linear axes relative to a measurement object. This includes coordinate measuring machines in which a measurement object is held movably on a rotary table or in a measurement object receptacle that is movable in some other way.

A change interface 22 is arranged at the lower free end of the sleeve 18, a multi-axis rotary joint 24 being secured here to the interface. The rotary joint 24 carries a measurement element 26, which is movable along the linear axes X, Y, Z and along axes of rotation, explained below, relative to a measurement object 28. FIG. 1 illustrates by way of example how the measurement object 28 is measured with the aid of the measurement element 26 in the region of a hole 29.

Reference numeral 30 designates an evaluation and control unit. The evaluation and control unit 30 includes a coordinate measuring machine (CMM) controller 32, which actuates the drives of the coordinate measuring machine 10 (not illustrated separately here) as a function of control data and accordingly provides for a movement of the measurement element 26 relative to the measurement object 28 along the linear axes and axes of rotation.

The evaluation and control unit 30 further includes an operating terminal 34 having a monitor 36 and a keyboard 38. In typical example embodiments, the operating terminal 34 is realized with the aid of a commercially available personal computer which can be operated with an operating system such as Windows®, Linux or MacOS and on which is executed software which firstly makes it possible to generate control data for the CMM controller 32 and which secondly serves for evaluating the measurement results obtained. By way of example, reference shall be made to the measurement and evaluation software CALYPSO®, which is offered commercially by the applicant.

The operating terminal 34 has a processor 40 in a manner known per se, on which processor the measurement and evaluation software is executed in an example embodiment of the novel method. The operating terminal 34 further has a memory 42, in which a plurality of parameters are stored or can be stored, the parameters defining limit values for permissible velocities and/or accelerations of the measurement element 26 along the movement axes of the coordinate measuring machine 10. In some example embodiments, the parameters can be input, selected and/or edited by way of the operating terminal 34.

Figure 2:
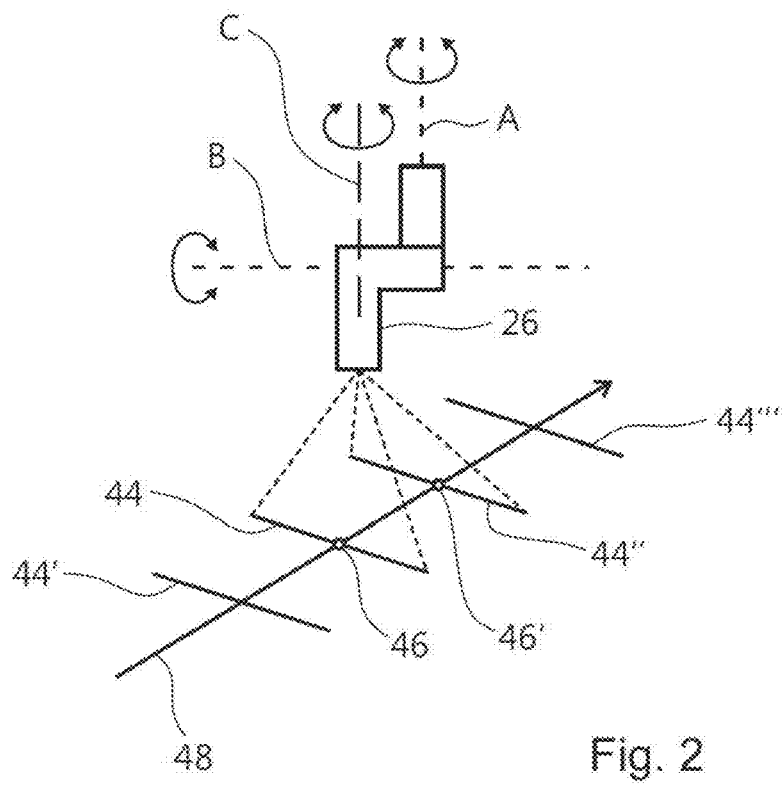
FIG. 2 shows a simplified illustration of the measurement element from the coordinate measuring machine from FIG. 1 during a movement along a measurement object surface.

Even though example embodiments of the novel coordinate measuring machine and of the novel method can be implemented with a tactile measurement element, the coordinate measuring machine 10 in various example embodiments has a measurement element 26 that effects non-contact measurement. For example, the measurement element 26 may be an optical measurement element. In various example embodiments, the measurement element 26 is a laser triangulation sensor such as is commercially offered for example by the applicant under the brand name EagleEye II. FIG. 2 shows such a measurement element in a greatly simplified illustration.

As is shown in FIG. 2, the measurement element 26 in various embodiments can be rotated or pivoted about one, two or even three axes of rotation relative to the measurement object 28. By way of example, three axes of rotation A, B and C are illustrated here. Advantageously, the B-axis here extends orthogonally to the A-axis and the C-axis. Particularly advantageously, the A-axis and the C-axis here extend approximately parallel to one another and are laterally offset with respect to one another in the direction of the B-axis. Furthermore, the measurement object 28 in further example embodiments can be mounted on a rotary table and/or be rotatable about one, two or three axes of rotation relative to the measurement element 26 (not illustrated here).

The measurement element 26 applies a measurement line 44 onto the measurement object surface. In various implementations, the measurement element 26 includes a light source that projects a light line as the measurement line 44. In various embodiments, the light source is a laser diode that projects a laser line onto the measurement object surface as the measurement line 44. The measurement element 26 here further has a camera sensor (not illustrated), which is arranged in a defined position and orientation relative to the light source. The measurement element 26 captures images of the object surface together with the measurement line 44 using the camera sensor. On the basis of trigonometrical relationships, the distance between the object surface illuminated by the measurement line 44 and the measurement element 26 can then be calculated from the images. In a departure from this example embodiment, measurement element 26 could project other light patterns onto the object surface in other example embodiments, such as a light pattern having a plurality of parallel stripes for instance.

In various embodiments, measurement element 26 defines a reference point 46 for measuring the measurement object. In the example embodiment illustrated here, reference point 46 lies in the center of the measurement line 44—and, in various implementations, specifically at the focus of the camera sensor. In other example embodiments, the reference point can be defined elsewhere on the measurement element 26, such as, for instance, at the ball center point of the probe ball of a tactile measurement element. In some example embodiments, the reference point is the so-called tool center point (TCP) of the measurement element 26.

In order to measure a measurement object using the measurement element 26, the measurement element 26 is moved relative to the measurement object such that the reference point 46 moves along a movement path 48 running here exactly on the surface of the measurement object. In various embodiments, the camera sensor of the measurement element 26 captures an image of the measurement object surface with the measurement line 44 in each case at defined time intervals during the movement. In FIG. 2, four temporally successive positions of the measurement line 44 along the movement path 48 are indicated by reference numerals 44', 44, 44" and 44"'.

Furthermore, in FIG. 2, reference numeral 46' indicates a variant in which the reference point 46 leads the measurement element 26 in the movement along the movement path 48. This can be achieved by the measurement element 26 being pivoted in the direction of the movement path 48. In other example embodiments, measurement element 26 could be pivoted during the measurement movement such that reference point 46 lags behind measurement element 26 in the movement. Furthermore, measurement lines 44, 44', 44", 44"' in further example embodiments may be oriented obliquely with respect to the movement path 48. As is explained in greater detail below, a desired orientation of measurement line 44 relative to the movement path 48, in various embodiments of the novel method, is taken into account in the determination of the control data for the CMM controller 32.

Figure 3:
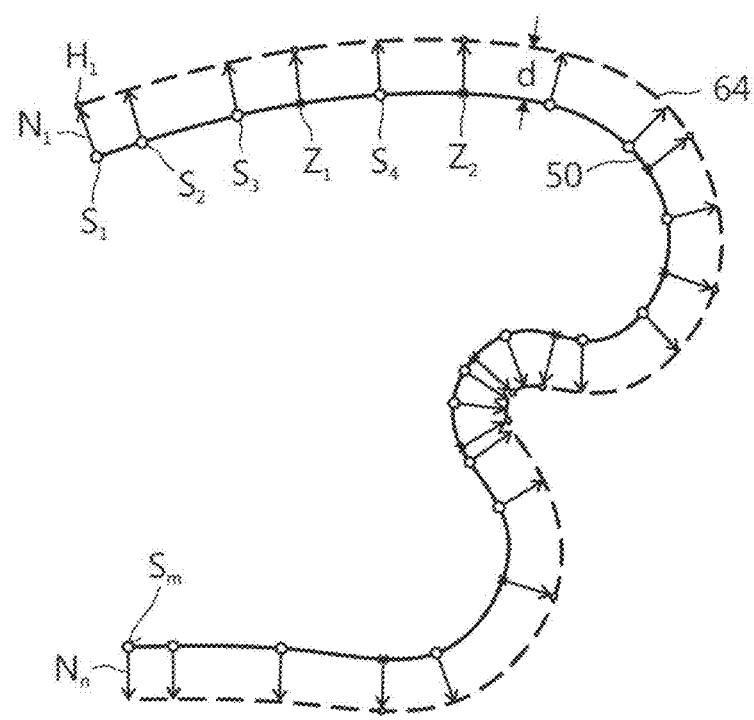
FIG. 3 shows an example desired measurement path with a plurality of desired positions.

In FIG. 3, a desired measurement path along which reference point 46 is intended to be moved on a measurement object surface is designated by reference numeral 50. In various embodiments, the desired measurement path 50 is determined with the aid of a spline interpolation that uses a plurality of desired positions S1, S2, S3, S4 as support points. In various example embodiments, a cubic-quadratic Bezier spline is placed through the sequence of the desired positions S1 in order to determine the desired measurement path 50. In this case, the desired positions can be specified as vectors in a coordinate system that is freely definable, in principle.

Advantageously, an auxiliary point $H_i$ is determined here for each desired position, as is indicated by auxiliary point $H_1$ in FIG. 3. The auxiliary points $H_i$ are situated at a constant distance away from the desired points $S_i$ in the direction of the respective surface normals $N_i$, as is indicated for the surface normal $N_1$. Here a further cubic-quadratic Bezier spline is placed through the auxiliary points. The two splines thus extend in a manner similar to a railway track, wherein the respective surface normals at the desired positions form the "railway sleepers". The auxiliary spline through the auxiliary points $H_i$, can advantageously be used to obtain a respectively optimum orientation of the measurement line 44 on the object surface in various embodiments of the novel method.

Figure 4:
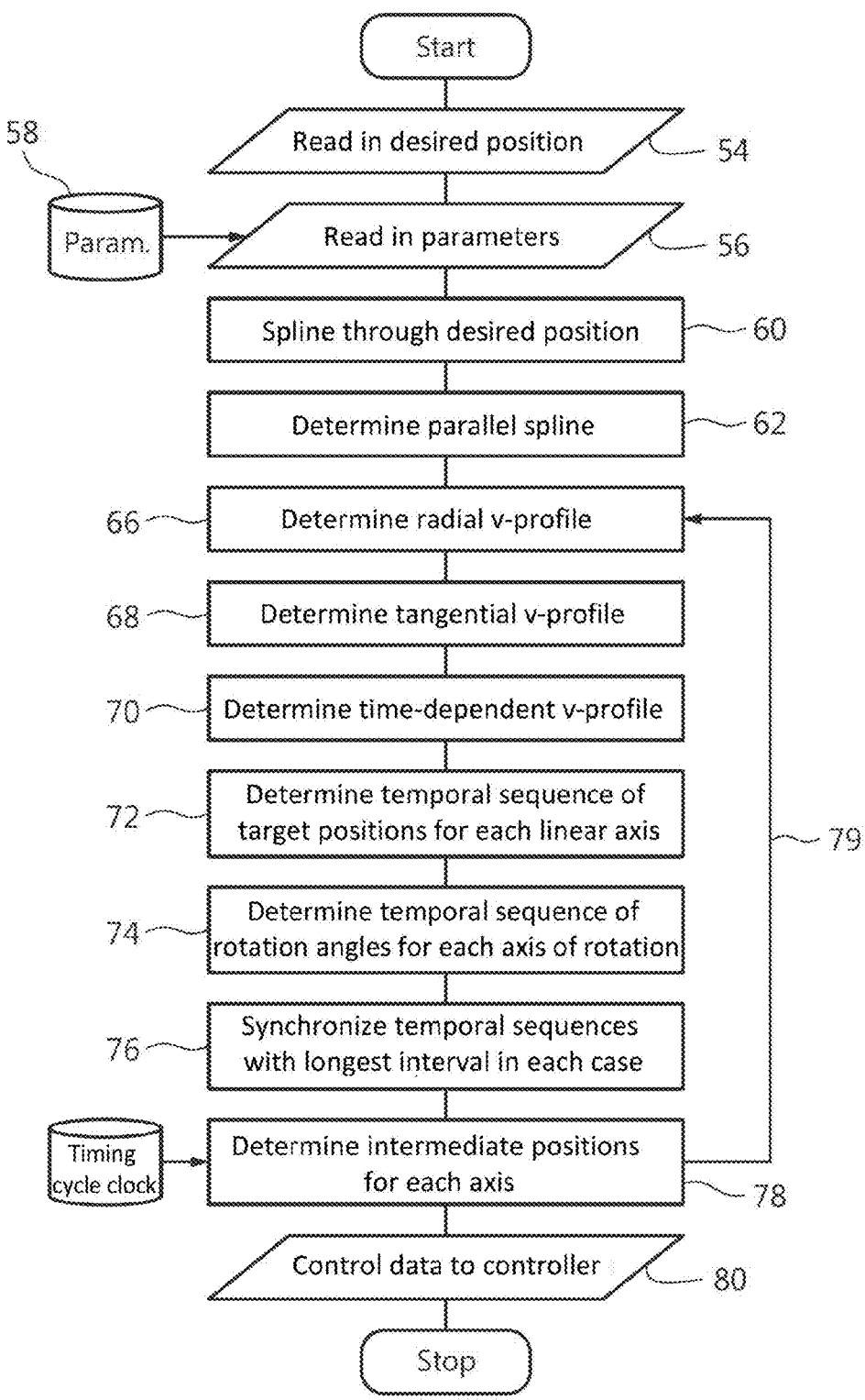
FIG. 4 shows a flow diagram for explaining an example embodiment of the novel method.

An example embodiment of the novel method will now be explained with reference to FIG. 4.

The starting point is a plurality of desired positions $S_i$ selected and/or defined for example by an operator of a coordinate measuring machine 10 on the basis of CAD data of the measurement object 28. In accordance with step 54, the desired positions are read in via operating terminal 34, for example by the operator selecting the desired positions with the aid of the keyboard 38 and/or using a mouse, a stylus or some other input device on the basis of a CAD representation of the measurement object. In accordance with step 56, a plurality of parameters 58 are read from memory 42 and/or input by the operator of the operating terminal 34. The parameters 58 include, in particular, one or more of the parameters mentioned below: velocity $v_{TCP}$ of the reference point 46, acceleration/deceleration $a_{TCP}$ of the reference point 46, velocity $v_{CMM}$ of the measurement element 26 along the linear axes, acceleration $a_{CMM}$ of the measurement element along the linear axes, angular velocities ω and/or angular accelerations a of the measurement element about the axes of rotation A, B, C, leading angle or trailing angle of the reference point 46 along the movement path 48 (see reference numeral 46 in FIG. 2) and angle between the measurement line 44 and the movement path 48.

In accordance with step 60, a desired measurement path 50 is determined using a spline interpolation by means of the desired positions read in. In accordance with step 62, here the auxiliary spline 64 (see FIG. 3) is determined at a constant distance d from the desired measurement path 50.

In accordance with step 66, a location-dependent desired radial velocity profile (curvature-dependent desired velocity profile) of reference point 46 along the desired measurement path 50 is then determined. This can advantageously be done using the limit value for the permissible acceleration $amax_{TCP}$ of the reference point 46. At each desired position $S_i$, the radial acceleration $v_i^2/r$ is intended to be less than the acceleration $amax_{TCP}$. Consequently, the following must hold true at each desired position for the radial velocity:

$$\tilde{v}\left(\tilde{S}_i\right) = \tilde{v}_i(s_i) = \tilde{v}_i \leq \sqrt{\frac{amax_{TCP}}{\rho_i}},$$

wherein $\rho_i$ is the averaged curvature of the curvatures of successive polynomials at the desired position Si. Moreover, the radial velocity is intended to be $$\tilde{v}_i \leq vmax_{TCP}$$

that is to say that the curvature-dependent velocity is intended not to exceed the limit value for the maximum permissible velocity. A curvature-dependent/radial velocity profile along the desired measurement path 50 is thus obtained here in step 66.

Step 68 involves determining a location-dependent tangential velocity profile (acceleration-dependent velocity profile) for the movement of the reference point 46 along the desired measurement path 50. At the beginning and at the end of the tangential velocity profile it holds true that $$v'_0 = v'_{n-1} = 0,$$

that is to say that the velocity at the beginning and at the end of the movement is 0.

For given $a_{max}$ and given distances, the following holds true recursively for the increase in the velocity in the tangential velocity profile with ascending indices $$v'_i = \sqrt{v'^2_{i-1} + 2 * a\ max_{soll} * \Delta s_i}, \Delta s_i = s_i - s_{i-1} \text{ and } i = 1, n-2,$$

wherein the velocity of the tangential velocity profile must not exceed the velocity $\dot{\tilde{v}}_i$ of the curvature-independent velocity profile $$v'_i = MIN(v'_i, \tilde{v}_i).$$

Step 70 then involves determining a time-dependent velocity profile $v=v(t_i)$ from the location-dependent velocity profile $v=v(s_i)$ by way of the relationship $\Delta s = \tilde{v} * \Delta t$. In this case, it holds true that $$t_0 = 0$$

and recursively $$t_i = t_{i-1} + \frac{\Delta s}{\tilde{v}} = t_{i-1} + \frac{s_i - s_{i-1}}{0.5 * (v_{i-1} + v_i)}, i = 1, n-1.$$

Steps 72 and 74 then involve determining the respectively suitable axial positions along the linear axes X, Y, Z and along the axes of rotation A, B. By way of the boundary condition that the vector $T_i$ from the measurement element 26 to the measurement object surface at each desired position is intended to be antiparallel to the normal vector $N_i$ and that the measurement line 46 at each desired position is intended to extend perpendicular to the movement path 48, it is possible to calculate the rotation angles at the desired positions. Furthermore, the axial positions of the measurement element 26 along the linear axes can be determined here using a spline interpolation for the desired positions of the measurement element 26 in the measurement volume. As a result of steps 72 and 74, what is obtained is a temporal sequence of target positions along each linear axis and a temporal sequence of rotation angles for each axis of rotation, that is to say thus temporal sequences of individual axial positions.

In accordance with step 76, the temporal sequences obtained are then synchronized as a function of the respectively maximum possible velocities and accelerations along the axes in order to produce a correlation of the individual movements. Depending on the maximum permissible velocities and accelerations, each change from a first axial position i to the next axial position i+1 requires an individual time interval and the individual time intervals along the individual axes can vary from desired position to desired position. For each desired position, the longest time interval in each case is then used as a basis:

$$ts_i = ts_{i-1} + \max(ta_i - ta_{i-1}) \text{ where } i=1,2,3 \ldots n-1 \text{ and } ts_0 = 0.$$

The letter a here stands for the movement along each of the axes. Accordingly, for each synchronized time interval $ts_{i-1}$, $ts_i$, the temporally longest movement in each case is adopted as a basis for the synchronization and the respectively shorter movement durations of the other axes are extended to the temporally longest axial movement. In this way, all temporal sequences of axial positions along the linear axes and axes of rotation obtain a common time base and are temporally and spatially correlated.

The CMM controller 32 typically requires control data for continuously controlling the measurement element 26 with a defined control data timing cycle, which may differ from the synchronized timing cycle of the axial positions from steps 74, 76. Therefore, here step 78 involves determining intermediate positions $Z_i$ for each movement axis, such that for all $\Delta_{control}$ current control data are available in each case for the individual axial movements.

FIG. 3 illustrates two intermediate positions $Z_1$ and $Z_2$ on the desired measurement path 50. The intermediate positions $Z_i$ can be inserted on the desired measurement path 50 in a recursive method, for example, in order to determine on the basis thereof modified synchronized temporal sequences in accordance with steps 72 to 76. This is indicated by the reference numeral in FIG. 3.

In accordance with step 80, the control data are transferred to the CMM controller 32 in the control data timing cycle $\Delta t_{control}$ and the measurement element 26 is moved by means of the transferred control data in a manner known per se.

The phrase at least one of A, B, and C should be construed to mean a logical (A OR B OR C), using a non-exclusive logical OR, and should not be construed to mean "at least one of A, at least one of B, and at least one of C."

What is claimed is:

1. A method for controlling a coordinate measuring machine including a machine controller, a measurement object receptacle, and a measurement element, wherein the measurement element defines a reference point and is movable within a measurement volume relative to the measurement object receptacle along a plurality of movement axes, and wherein the plurality of movement axes include a plurality of linear axes and at least one axis of rotation, the method comprising:

obtaining a plurality of desired positions of the reference point within the measurement volume;

obtaining a plurality of parameters defining limit values for at least one of permissible velocities or permissible accelerations of the measurement element along the plurality of movement axes;

determining a plurality of axial position series as a function of the desired positions of the reference point and as a function of the plurality of parameters, wherein each axial position series from the plurality of axial position series defines an individual series of target positions of the measurement element along one respective linear axis from the plurality of linear axes;

determining a plurality of successive rotation angle values as a function of the desired positions of the reference point and as a function of the plurality of parameters, wherein each rotation angle value from the plurality of successive rotation angle values represents a rotation angle of the measurement element about the at least one axis of rotation at the respective target positions of the measurement element along the plurality of linear axes;

determining a plurality of individual temporal sequences of target positions for each linear axis from the plurality of linear axes, wherein the plurality of individual temporal sequences of target positions each have individual time intervals between successive ones of the individual target positions;

determining a respective temporal sequence of successive rotation angle values for the at least one axis of rotation, wherein the respective temporal sequence of successive rotation angle values has individual time intervals between successive rotation angle values;

synchronizing the plurality of individual temporal sequences of target positions and the respective temporal sequence of successive rotation angle values onto a common timing cycle by using a respective longest individual time interval among the plurality of individual time intervals for each respective target position and each respective rotation angle value; and moving the measurement element to the respectively successive target positions and rotating the measurement element using the plurality of rotation angle values in accordance with the common timing cycle.

2. The method of claim 1, further comprising:
determining, as a function of the plurality of desired positions, a desired measurement path of the reference point within the measurement volume with the aid of interpolation,
wherein the plurality of axial position series are determined as a function of the desired measurement path.

3. The method of claim 1, further comprising determining a location-dependent desired radial velocity profile and a location-dependent desired tangential velocity profile of the reference point along the plurality of desired positions as a function of the plurality of parameters.

4. The method of claim 3, further comprising determining a desired temporal velocity profile of the reference point within the measurement volume as a function of the location-dependent desired radial velocity profile and as a function of the location-dependent desired tangential velocity profile.

5. The method of claim 1, wherein:
the measurement element defines a measurement line running through the reference point and
the measurement line includes a plurality of measurement points.

6. The method of claim 5, wherein the plurality of axial position series and the plurality of successive rotation angle value are further determined as a function of a spatial orientation of the measurement line.

7. The method of claim 6, wherein the spatial orientation of the measurement line is chosen transversely to a path along the plurality of desired positions of the reference point.

8. The method of claim 6, wherein the spatial orientation of the measurement line is chosen such that the reference point leads or lags behind the measurement element along the plurality of desired positions.

9. The method of claim 1, further comprising determining a sequence of control data for the machine controller as a function of the plurality of individual temporal sequences of target positions.

10. The method of claim 9, wherein the sequence of control data is determined with a predefined control data timing cycle that is derived from the common timing cycle by intermediate positions being determined.

11. The method of claim 1, wherein the measurement object receptacle includes a rotary table.

12. A coordinate measuring machine for determining at least one of dimensional or geometric properties of a measurement object, the coordinate measuring machine comprising:
a machine controller;
a measurement object receptacle;
a measurement element defining a reference point and being movable relative to the measurement object receptacle along a plurality of movement axes, wherein the plurality of movement axes include a plurality of linear axes and at least one axis of rotation; and
an operating terminal,
wherein the machine controller is configured to move the measurement element as a function of control data along the plurality of movement axes in order to record measurement values at the measurement object,
wherein the operating terminal comprises
an interface for receiving a plurality of desired positions of the reference point at the measurement object;
a memory configured to store a plurality of parameters defining limit values for at least one of permissible velocities or permissible accelerations of the measurement element along the plurality of movement axes; and
a processor, and
wherein the processor is configured to:
determine a plurality of axial position series as a function of the desired positions of the reference point and as a function of the plurality of parameters, wherein each axial position series from the plurality of axial position series defines an individual series of target positions of the measurement element along one respective linear axis from the plurality of linear axes;

determine a plurality of successive rotation angle values as a function of the desired positions of the reference point and as a function of the plurality of parameters, wherein each rotation angle value from the plurality of successive rotation angle values represents a rotation angle of the measurement element about the at least one axis of rotation at the respective target positions of the measurement element along the plurality of linear axes;

determine a plurality of individual temporal sequences of target positions for each linear axis from the plurality of linear axes, wherein the plurality of individual temporal sequences of target positions each have individual time intervals between successive ones of the individual target positions;

determine a respective temporal sequence of successive rotation angle values for the at least one axis of rotation, wherein the respective temporal sequence of successive rotation angle values have individual time intervals between successive rotation angle values;

synchronize the plurality of individual temporal sequences of target positions and the respective temporal sequence of successive rotation angle values onto a common timing cycle by using a respective longest individual time interval among the plurality of individual time intervals for each respective target position and each respective rotation angle value; and determine the control data as a function of the plurality of individual temporal sequences of target positions and the respective temporal sequence of successive rotation angle values synchronized onto the common timing cycle.

13. A computer program product comprising a non-transitory storage medium storing program code that is configured to carry out a method for controlling a coordinate measuring machine including a machine controller, a measurement object receptacle and a measurement element, wherein the measurement element defines a reference point and is movable within a measurement volume relative to the measurement object receptacle along a plurality of movement axes, and wherein the plurality of movement axes include a plurality of linear axes and at least one axis of rotation, the method comprising:

obtaining a plurality of desired positions of the reference point within the measurement volume;

obtaining a plurality of parameters defining limit values for at least one of permissible velocities or permissible accelerations of the measurement element along the plurality of movement axes;

determining a plurality of axial position series as a function of the desired positions of the reference point and as a function of the plurality of parameters, with each axial position series from the plurality of axial position series defining an individual series of target positions of the measurement element along one respective linear axis from the plurality of linear axes;

determining a plurality of successive rotation angle values as a function of the desired positions of the reference point and as a function of the plurality of parameters, with each rotation angle value from the plurality of successive rotation angle values representing a rotation angle of the measurement element about the at least one axis of rotation at the respective target positions of the measurement element along the plurality of linear axes;

determining a plurality of individual temporal sequences of target positions for each linear axis from the plurality of linear axes, wherein the plurality of individual temporal sequences of target positions each have individual time intervals between successive ones of the individual target positions;

determining a respective temporal sequence of successive rotation angle values for the at least one axis of rotation, the respective temporal sequence of successive rotation angle values having individual time intervals between successive rotation angle values;

synchronizing the plurality of individual temporal sequences of target positions and the respective temporal sequence of successive rotation angle values onto a common timing cycle by using a respective longest individual time interval among the plurality of individual time intervals for each respective target position and each respective rotation angle value; and moving the measurement element to the respectively successive target positions and rotating the measurement element using the plurality of rotation angle values in accordance with the common timing cycle.

* * * * *